United States Patent [19]

Callander et al.

[11] Patent Number: 4,654,399

[45] Date of Patent: Mar. 31, 1987

[54] COMPOSITION AND PROCESS FOR MAKING AN AMBER COLORED POLYESTER

[75] Inventors: Douglas D. Callander, Akron; Freddie L. Massey, Uniontown, both of Ohio

[73] Assignee: The Goodyear Tire & Rubber Company, Akron, Ohio

[21] Appl. No.: 500,499

[22] Filed: Jun. 2, 1983

[51] Int. Cl.[4] .......................... C08G 63/34; C08K 5/00
[52] U.S. Cl. ...................................... 524/720; 524/878
[58] Field of Search ................ 524/878, 720; 528/279

[56] References Cited

U.S. PATENT DOCUMENTS

| | | |
|---|---|---|
| 3,056,818 | 10/1962 | Werber ................................ 528/279 |
| 3,406,153 | 10/1968 | Eaton et al. ......................... 524/878 |
| 3,441,540 | 4/1969 | Muller et al. ........................ 524/878 |
| 3,644,291 | 2/1972 | Price et al. .......................... 528/279 |
| 3,781,245 | 12/1973 | Itabashi et al. ...................... 528/279 |
| 3,870,688 | 3/1975 | Makimura et al. ................... 528/279 |
| 4,260,735 | 4/1981 | Bander et al. ....................... 528/279 |
| 4,374,949 | 2/1983 | Massey et al. ....................... 524/878 |

*Primary Examiner*—Lewis T. Jacobs
*Attorney, Agent, or Firm*—Alvin T. Rockhill

[57] ABSTRACT

Specific color imparting compounds, including colorants and catalysts are used to produce a polyester resin having an amber color. The compounds are added during the preparation of the polymer and the resins produced can be utilized to make various containers or packages to hold liquids or solids.

15 Claims, No Drawings ically. However, to impart a color, for example, am-

COMPOSITION AND PROCESS FOR MAKING AN AMBER COLORED POLYESTER

TECHNICAL FIELD

The present invention relates to an amber colored polyester made using specific color-imparting compounds.

Heretofore, various desired colors have been imparted to items, for example, glass, paint, paper, etc., through the use of various minerals, pigments, inks, and the like. However, to impart a color, for example, amber, to a polyester which can be made into a container, e.g., a bottle, for containing liquids or solids as for human consumption, requires that specific safe color-imparting compounds be used. Furthermore, the pigments or catalysts must not adversely affect the properties of the polymer.

DISCLOSURE OF INVENTION

There is disclosed a polyester article, the improvement which comprises a small amount of various color-imparting compounds contained in the polyester for imparting an amber color thereto; said compounds comprising a yellow colorant, a titanium catalyst, a blue pigment, and a red colorant; the proportion of said compounds being sufficient to effect an amber color.

Also disclosed is an amber colored polyester resin comprising color-imparting compounds dispersed in the polyester resin, said compounds being a yellow colorant, a titanium catalyst, a red colorant and a blue pigment, the amount of said compounds being such so that an amber color is imparted to said polyester resin.

There is also disclosed a process for making a polyester resin having an amber color comprising the steps of preparing a polyester resin; adding a yellow colorant to said polyester resin during preparation thereof; adding a titanium catalyst to said polyester resin during preparation thereof; adding a blue pigment to said polyester resin during preparation thereof; adding a red colorant to said polyester resin, and imparting an amber color to said resin by utilizing sufficient amounts of said yellow colorant, said titanium catalyst, said red colorant and said blue pigment.

BEST MODE FOR CARRYING OUT THE INVENTION

According to the concepts of the present invention, an amber colored polyester resin suitable for the production of containers, packages, etc., and especially for carbonated beverages, is produced. The polyester to which an amber color can be imparted are conventional or known polyesters made according to conventional or known methods, processes and the like. Generally, such polyesters include polymers formed from dicarboxylic acids containing a total of from 2 to 16 carbon atoms reacted with polyhydric alcohols such as glycols or diols containing from 2 to 12 carbon atoms. The alkyl dicarboxylic acids may contain a total of from 2 to 16 carbon atoms. Preferably, the acids are aryl or an alkyl substituted aryl acid containing from 8 to 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as terephthalic acid, isophthalic acid and naphthalene dicarboxylic acids. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalene dicarboxylic acid such as dimethyl substituted naphthalene 2,6 dicarboxylic acid and dimethyl substituted naphthalene 2,7 dicarboxylic acid, and the various isomers of diethyl substituted naphthalene dicarboxylic acids. Generally, terephthalic acid is highly preferred.

It is well known to those skilled in the art, in lieu of the various dicarboxylic acids, the various diesters thereof may be utilized. Thus, alkyl diesters containing a total of from 2 to about 20 carbon atoms as well as alkyl substituted aryl diesters containing from about 10 to about 20 carbon atoms may be utilized. Examples of diesters include the diesters of oxalic acid, malonic acid, succinic acid, glutaric acid, adipic acid, pimelic acid, suberic acid, azelaic acid, or sebacic acid, and the like. Specific examples of various alkyl substituted aryl diesters include the varous isomers of dimethylphthalate such as dimethylterephthalate, a preferred compound, the various isomers of diethylphthalate, the various isomers of dimethylnaphthalate, and the various isomers of diethylnaphthalate.

The diols or glycols may be straight chain or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred with ethylene glycol and 1,4-butane diol being highly preferred. In lieu of the various glycols, another class of polyhydric alcohols, such as the glycol ethers containing from 4 to 12 carbon atoms, can be utilized as for example diethylene glycol and 1,4-dihydroxyethoxy benzene.

The polyesters can be made according to melt polymerization, or melt and solid state polymerization. As known to those skilled in the art, polyesters are generally made in two stages. In the first stage or esterification stage, the diacid is reacted with the diol at elevated temperatures and pressures with water being produced. In the second stage or the polycondensation stage, a vacuum is gradually applied, generally catalyst are utilized, and water and a diol are withdrawn as a condensation product. Various polyesters can be made by such a polymerization including polyethyleneterephthalate, a preferred polyester resin. Moreover, the process may be modified slightly by reacting the dicarboxylic acid with the diol in a solvent which is a low molecular weight linear polyester in a manner as set forth in U.S. Pat. No. 4,020,049 to Rinehart, which is hereby fully incorporated with regard to the method of making the polyester resin. Another well known variation utilizes dimethylterephthalate which is reacted with ethylene glycol in the presence of a catalyst with a transesterification reaction yielding a bishydroxyethylterephthalate compound. A stabilizer may then be added as well as a catalyst and a polycondensation reaction is carried out to yield a polyester. Regardless of the exact process, such reactions can be carried out in situ. When prepared by a melt polymerization process, the resin is thermally crystallized to prevent sticking during drying prior to subsequent melt conversion into an article.

Solid state polymerization can also be utilized. In this process, the polycondensation reaction is carried out until generally the intrinsic viscosity of the polymer melt reaches about 0.20 or higher, for example, up to about 0.80. At this point, the solution melt is cooled to produce a solid which is then pelletized, chopped, etc. The pellets are then subjected to a solid state polymerization wherein the vacuum is applied or a stream of inert gas passed at a temperature below the melting point of the partially formed polymer. Thus, the polymer is actually polymerized in a solid state, with the polycondensation reaction being continued in such a state. Generally, the solid state polymerization is continued until the intrinsic viscosity reaches any desirable level, such as from about 0.60 to about 1.0, or even higher. Desirably, the intrinsic viscosity ranges from about 0.70 to about 0.85 and preferably from about 0.70 to about 0.80. By intrinsic viscosity it is meant that the value obtained when $^n$specific$^{/C}$ or $LOG$ $n_{rel.}/C$ is extrapolated to zero concentration; where the relative viscosity is defined as the quotient of the solution viscosity, $n_{soln.}$ and the viscosity of the solvent $n_{solv.}$, i.e., $n_{rel.} = n_{soln.}/n_{solv.}$. The specific viscosity $n_{sp.} = n_{rel.} - 1$. The units are deciliters/gram using a 60/40 phenol/tetrachlorothane at 25° C. The symbol n is for the Greek letter eta.

When the polyester resin is intended for use in contact with food, only those polyesters which are regulated by the Federal Food and Drug Administration should be utilized, such as set forth in Title 21, §177.1630, for example, the polyethylenephthalate polymers, and such polyesters are preferred in the present invention.

An amber colored polyester resin is produced by utilizing specific color-imparting compounds to produce the amber color. Specifically, a yellow colored compound is utilized with a blue colored compound, and a red colored compound to yield an intermediate amber color. The resin color is measured by a Gardner Colormeter, or a Hunter Lab instrument is utilized for beverage bottle measurements. The Gardner meter utilizes reflectance (Rd) values as a measure of brightness, whereas the Hunter instrument utilizes luminance (L) as a measure of the brightness. The color hue is defined in either case by (a) or (b) values. Positive (a) coordinates (that is, an X axis) measures redness whereas Negative (a) values indicate greeness. Positive (b) (that is, positive Y coordinates) define yellowness whereas negative (b) values indicate blueness. The brightness (reflectance or luminance) of the sample is required as a point from 0 (black) to 100 (white) using both instruments. These measurements enable an approximation of the visual color used in the instrument coordinates. The measured (a) and (b) values therefore place a resin or a bottle made from the resin in one of the colored quadrants formed by their axes. In an anticlockwise direction, starting at the three o'clock position, the first quadrant is red/yellow, the second quadrant is yellow/green, the third quadrant is green/blue, and the fourth quadrant is blue/red. The color amber of the resin of the present invention is in the first quadrant, that is basically a reddish-brown compound with a yellow tinge thereto.

Regardless of the type (that is, chemical formulation) of polyester or the process utilized, an amber color is imparted to the polyester by utilizing specific color imparting compounds. The compounds which are utilized include yellow colorant, red colorant, titanium catalysts, and a blue pigment. Additionally, the polyester can contain conventional additives such as stabilizers, antioxidants, and the like.

The titanium catalysts can be alkyl esters having from 3 to 10 carbon atoms, or titanium chelates having from 4 to 50 carbon atoms with from 6 to 32 carbon atoms being preferred. The titanium catalysts act as a polycondensation catalyst as well as influence the shade of the polyester. Of the numerous titanates which may be utilized, the following are desirable, titanium triethanolamine, titanium acetyl acetonate, tetrabutyl titanate, tetraisopropyl titanate, and titanium glycolate. Examples of suitable titanium chelates include titanium acetyl acetonate, triethanolamine titanium chelate, lactic acid titanium chelate, tetraoctylene glycol chelate, and the like. The first two chelates are often referred to as titanium alkyl esters and thus have also been previously listed as such. A specific source of chelates are the DuPont Co. under the name "TYZOR". Of the various titanium compounds, titanium triethanolamine chelate is preferred with tetrabutyl titanate being highly preferred. The amount of the titanium catalysts as titanium (Ti), based upon one million parts by weight of the final amount of polyester resin produced generally ranges from about 2 parts to about 150 parts, with from about 40 to about 70 parts being desirable and approximately 50 parts by weight being preferred. The titanium catalysts can be added during the esterification or polycondensation stage.

A blue pigment is utilized so that in combination with the yellow and red colorant and the titanium catalysts, an amber color is produced. That is, the amber colored resin of the present invention resides within the first above-noted color quadrant. Based upon the (a) and (b) coordinates, the color utilizing a one-eighth inch thermally crystallized resin cube having a density of approximately 1.37 grams per cc is as follows: Gardner values of from about 0 to about +10 and preferably from about +2 to about +6 on the (a) scale, and from about 0 to about 12 and preferably from about 3 to about 9 on the (b) scale or coordinate. The Hunter value ranges from about −2 to about +6 and preferably from about 0 to about +3 on the (a) coordinate and from about −1 to about +9 and preferably from about +1 to about +5 on the (b) coordinate. When a bottle, a 2 liter beverage bottle, is produced, the Hunter values generally, depending on the bottle design, range from about +2 to about +16 and preferably from about +8 to about +14 on the (a) coordinate and from about +18 to about +36 and preferably from about +23 to about +32 on the (b) coordinate. Thus, essentially an amber color is produced or more exactly, a reddish-brown color having a yellow tinge thereto.

The blue pigment which is utilized can be any blue pigment which produces, in combination with the other pigments and catalysts, the desired amber color. Desirably, a pigment blue number 15 is desired, that is C.I. (color index number) of 74160. A specific example of the blue pigment which is preferably added during the esterification stage, but it can also be added during the polycondensation stage, is phthalocyanine blue. Phthalocyanine blue is commercially available from many suppliers such as Paliofast Blue manufactured by BASF, or as Monastral Blue, manufactured by DuPont. The amount of phthalocyanine blue utilized per million parts of the final polyester resin produced ranges from about 20 to about 100 parts by weight, with a preferred range being from about 30 to about 50 parts by weight.

The yellow colorant which is utilized can be any pigment which produces, in combination with the other pigment and titanium catalyst, the desired amber color. Preferaby the yellow colorant is Solvaperm Yellow G (CAS No. 10319-14-9) which is commercially available from American Hoechst Corporation. The yellow colorant is preferably added during the esterification stage, but it can also be added during the polycondensation stage. The amount of Solvaperm Yellow G utilized per million parts of the final polyester resin produced ranges from about 100 to about 800 parts by weight with a preferred range being from about 250 to 600 by weight.

The red colorant which is utilized can be any pigment which produces, in combination with the other pigment and titanium catalyst, the desired amber color. The red pigment is preferably added during the esterification stage, but it can also be added during the polycondensation stage. A specific example of the red pigment is Solvaperm Red G also designated as Solvent Red 135 and is commercially available from American Hoechst Corporation. The amount of Solvaperm Red G utilized per million parts of final resin produced ranges from about 100 to 800 parts by weight with a preferred range being from 250 to 600 by weight.

The polyester resins of the present invention can be utilized in various conventional process apparatus such as calendars, injection molding machines, blow molding machines, extrusion machines, and the like, to produce any desired article which has a amber color thereto. A particular area of use is a container area, such as bottles, and more particularly beverage bottles, for example liquor bottles.

The invention will be better understood by reference to the following examples.

Amber PET resins have been prepared according to the invention via batch processes (although continuous processes can also be utilized). In the following examples, titanium catalyst level used are indicated by parts per million of Ti by weight of PET. The phthalocyanine blue pigment, the red pigment and yellow pigment amount used is also in parts per million by weight of PET.

The appropriate amount of phthalocyanine blue pigment, red pigment and yellow pigment is slurried in ethylene glycol and added to a low molecular weight oligomeric mixture of PET at 270°-290° C. in a manner as set forth in U.S. Pat. No. 4,020,049 to Rinehart. A portion of this esterification product mixture is transformed to another vessel where separately prepared solutions and Tyzor TBT (tetrabutyl titanate) in ethylene glycol are added. The pressure of the vessel is gradually reduced to less than 1 millimeter of mercury to polycondense the mixture to an amber PET with the desired molecular weight (I.V.). A thermal crystallization is then carried out to yield a resin which doesn't stick together during drying prior to conversion to carbonate beverage bottles. The amounts of the various compounds as well as the color is set forth in Table I.

TABLE I

| Composition | ppm |
|---|---|
| TBT | 50 |
| SY | 450 |
| SR | 450 |
| PB | 40 |

| COLOR | |
|---|---|
| GARDNER | HUNTER LAB |

TABLE I-continued

| | Rd | a | b | L | a | b |
|---|---|---|---|---|---|---|
| RESIN | | | | | | |
| Amorphous | 2.1 | 1.5 | −0.6 | | | |
| Crystalized | 5.8 | 4.1 | 6.7 | 22.3 | 1.9 | 3.9 |
| PREFORM (2 liter) | | | | 4.6 | 1.1 | 0.7 |
| BOTTLE (2 liter) | | | | 45.1 | 12.4 | 27.9 |

TBT = Tyzor TBT (tetrabutyl titanate)
SY = Solvaperm Yellow G
SR = Solvaperm Red G
PB = Phthalocyanine Blue Pigment 15
Color Index No. 74160

As apparent from the above table, the bottle tends to have a slightly different color than the crystallized resin. This is due to the fact that the bottle thickness is generally thinner than the resin and thus imparts a different color. In any event, a suitable end color can be readily achieved.

While having described the best mode as well as the preferred embodiments of the present invention, in accordance with the patent statutes, it is noted that the invention is not limited thereto, the scope of the invention being measured by the attached claims.

We claim:

1. In a polyester article the improvement comprising a small amount of various color-imparting compounds contained in the polyester for imparting an amber color thereto, wherein said polyester is a saturated polyester which is made from the reaction of a dicarboxylic acid or diester with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of from 8 to about 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof, said color-imparting compounds comprising (1) a titanium catalyst wherein said titanium catalyst is a titanium chelate or a titanium ester and wherein the amount of said titanium catalyst ranges from 2 to 150 parts by weight based upon one million parts of said polyester, (2) phthalocyanine blue, wherein the amount of phthalocyanine blue ranges from 20 to 100 parts by weight based upon one million parts of said polyester, (3) a yellow colorant which has CAS No. 10319-14-9 wherein, the amount of yellow colorant ranges from 100 to 800 parts by weight based upon one million parts of said polyester, and (4) Solvent Red 135, wherein the amount of Solvent Red 135 ranges from 100 to 800 parts by weight based upon one million parts of said polyester, the proportion of said compounds being sufficient to effect an amber color in the article having a Hunter (a) coordinate value of from +2 to +16 and a Hunter (b) coordinate value of from +18 to +36.

2. A polyester article according to claim 1 wherein said titanium catalysts is selected from the group consisting of titanium triethanolamine, titanium acetyl acetonate, tetrabutyl titanate, tetraisopropyl titanate, titanium glycolate, lactic acid titanium chelate, tetraoctylene glycol titanium chelate, and combinations thereof.

3. A polyester article according to claim 2 wherein said article is in the form of a preform.

4. A polyester article according to claim 3 wherein said polyester is polyethylene terephthalate.

5. An amber colored polyester resin comprising color-imparting compounds dispersed in the polyester resin, wherein said polyester is a saturated polyester which is made from the reaction of a dicarboxylic acid or diester with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of from 8 to about 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof, said color-imparting compounds comprising (1) a titanium catalyst wherein said titanium catalyst is a titanium chelate or a titanium ester and wherein the amount of said titanium catalyst ranges from 2 to 150 parts by weight based upon one million parts of said polyester, (2) phthalocyanine blue, wherein the amount of phthalocyanine blue ranges from 20 to 100 parts by weight based upon one million parts of said polyester, (3) a yellow colorant which has CAS No. 10319-14-9, wherein the amount of yellow colorant ranges from 100 to 800 parts by weight based upon one million parts of said polyester, and (4) Solvent Red 135, wherein the amount of Solvent Red 135 ranges from 100 to 800 parts by weight based upon one million parts of said polyester, the proportion of said compounds being sufficient to effect an amber color in the resin having a Hunter (a) coordinate value of from 0 to 10 and a Hunter (b) coordinate value of from +0 to +12 measured on a one-eighth inch thermally crystallized resin cube having a density of approximately 1.37 grams per cc.

6. A polyester resin according to claim 5 wherein said titanium catalyst is selected from the group consisting of titanium triethanolamine, titanium acetyl acetonate, tetrabutyl titanate, tetraisopropyl titanate, titanium glycolate, lactic acid titanium chelate, tetraoctylene glycol titanium chelate, and combinations thereof.

7. A polyester resin according to claim 6 wherein the intrinsic viscosity of said resin ranges from 0.60 to about 1.0.

8. A polyester resin according to claim 7, wherein said polyester resin is polyethyleneterephthalate.

9. A process for making a polyester resin having an amber color comprising the steps of preparing a saturated polyester resin, by the reaction of a dicarboxylic acid or diester, with a polyhydric alcohol, said dicarboxylic acid selected from the group consisting of alkyl dicarboxylic acids having a total of from 2 to 16 carbon atoms, aryl or alkyl substituted aryl dicarboxylic acids containing a total of 8 to 16 carbon atoms, and combinations thereof, said diester selected from the group consisting of an alkyl diester having from 4 to 20 carbon atoms, an alkyl substituted aryl ester having from 10 to 20 carbon atoms, and combinations thereof, and wherein said polyhydric alcohol is selected from the group consisting of glycols having from 2 to 12 carbon atoms, from glycol ethers containing from 4 to 12 carbon atoms, and combinations thereof, adding a titanium catalyst to said polyester resin during the preparation thereof, wherein said titanium catalyst is a titanium chelate or a titanium ester, adding phthalocyanine blue to said polyester resin during the preparation thereof, adding a yellow colorant which has CAS No. 10319-14-9 to said polyester resin during the preparation thereof, adding Solvent Red 135 to said polyester resin during the preparation thereof and imparting an amber color to said resin by utilizing sufficient amounts of said titanium catalyst, said blue pigment, said yellow colorant and said red colorant.

10. A process according to claim 9, wherein the amount of titanium catalyst utilized is such that amount of titanium ranges from 2 to 150 parts by weight based upon one million parts of said polyester, wherein the amount of yellow colorant ranges from 100 to 800 parts by weight based upon one million parts of said polyester, wherein the amount of phthalocyanine blue ranges from 20 to 100 parts by weight based upon one million parts of said polyester and wherein said red colorant ranges from 100 to 800 parts by weight based upon one million parts of said polyester.

11. A process according to claim 10, wherein said titanium catalysts is selected from the group consisting of titanium triethanolamine, titanium acetyl acetonate, tetrabutyl titanate, tetraisopropyl titanate, titanium glycolate, lactic acid titanium chelate, tetraoctylene glycol titanium chelate, and combinations thereof.

12. A process according to claim 11, including polymerizing said polyester resin during preparation thereof so that the intrinsic viscosity ranges from about 0.60 to about 1.0.

13. A process according to claim 12, wherein said titanium catalyst is tetrabutyl titanate and wherein said intrinsic viscosity of said resin ranges from 0.70 to 0.85.

14. A process according to claim 13, wherein said polyester is polyethylene terephthalate.

15. A process according to claim 10, including adding said yellow colorant, said phthalocyanine blue and red colorant during the esterification stage of preparation and including adding said titanium catalysts during the polycondensation stage of preparation.

* * * * *